E. NICHOLSON.

Mechanical Movements for Operating Throttle-Valves.

No. 5,751. Reissued Feb. 3, 1874.

*Attest,*

Baltis & Long
B. H. Morse

*Inventor.*

Eugene Nicholson
by his Atty
Wm. D. Baldwin

AM. PHOTO-LITHOGRAPHIC Co. N.Y. (OSBORNE'S PROCESS)

UNITED STATES PATENT OFFICE.

EZRA NICHOLSON, OF CLEVELAND, OHIO.

IMPROVEMENT IN MECHANICAL MOVEMENTS FOR OPERATING THROTTLE-VALVES.

Specification forming part of Letters Patent No. 122,484, dated January 2, 1872; reissue No. 5,751, dated February 3, 1874; application filed January 3, 1874.

*To all whom it may concern:*

Be it known that I, EZRA NICHOLSON, of Cleveland, in the county of Cuyahoga and State of Ohio, have invented certain new and useful Improvements in Mechanical Movements for Operating Throttle-Valves of Engines, of which the following is a specification:

My invention more especially relates to that class of engines which are adapted to be mounted upon or attached to a sewing-machine, or other similar mechanism requiring a light driving power. Its object is to enable the operator to control the engine without the use of his hands; and the improvement consists in combining, with the throttle-valve of an engine, a knee or foot lever, by which the valve may be opened or closed.

Figure 1:
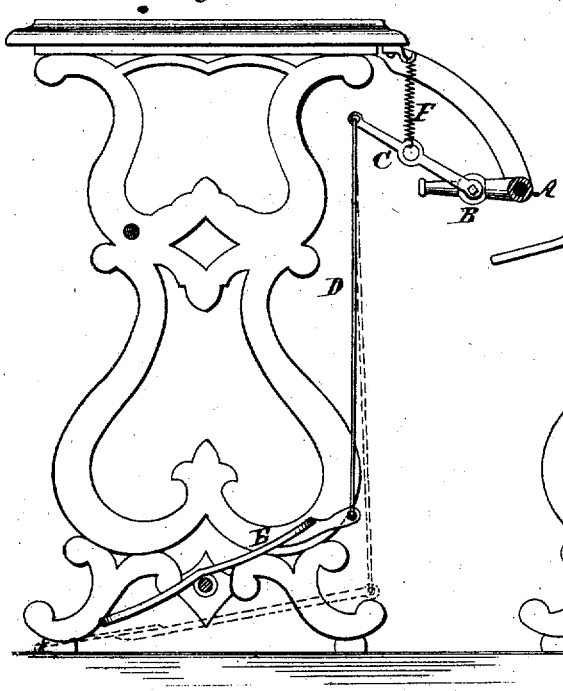
Figure 2:
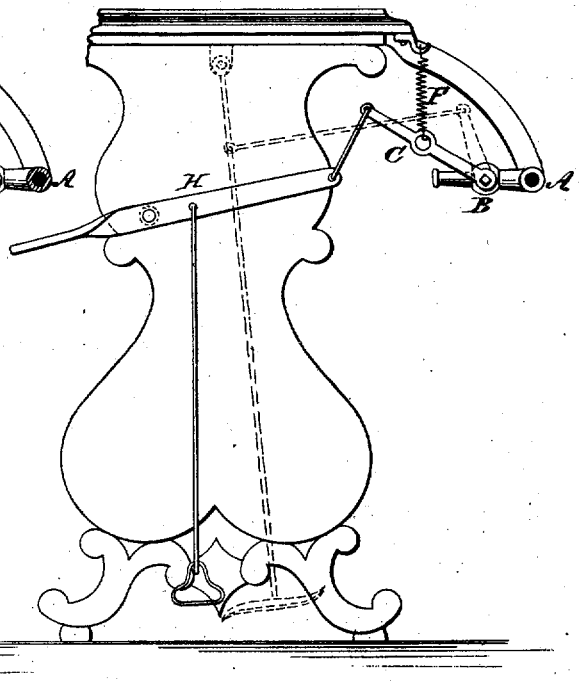
Figure 3:
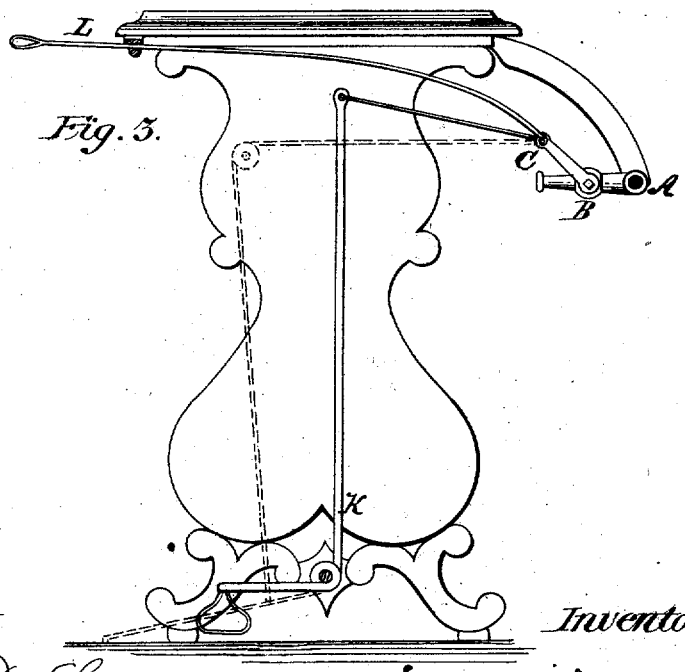

In the accompanying drawings, Figure 1 represents a side elevation of a sewing-machine stand to which my improvements are adapted, the throttle-valve being shown as connected with a foot-treadle. Figs. 2 and 3 represent modifications of my invention.

A pipe, A, is connected with an engine mounted upon or secured to the stand. (See my Patent No. 121,891, dated December 12, 1871.) A throttle-valve, B, in this pipe, is provided with a lever, C, connected by a link, D, with the foot lever or treadle E. A spring, F, is, by preference, used to close the valve positively whenever the treadle or lever is released.

The operation of the device is obvious. The operator regulates the speed of the engine simply by pressing on the treadle, thus leaving his hands free, while the engine is stopped by the closing of the valve by the spring the moment the pressure on the treadle is relieved.

It is obvious that the valve might be both opened and closed by the rocking of the foot-treadle; but I prefer to use a spring as being quick in its movement and less fatiguing for the operator than working the valve both ways by his foot. The treadle obviously might be separate from the stand and have one end rest on the floor, as shown in dotted lines in Fig. 1.

In Fig. 2, a lever, H, is shown so arranged that it may be worked by an upward pressure of the knee, or it may be so pivoted as to swing laterally, if preferred. A link-rod terminating in a stirrup may be used in connection with this lever H, or it may be connected directly with the valve-lever, instead of to the lever H. Fig. 2 also shows, in dotted lines, a mode of connecting the throttle-lever with a pendulum stirrup or treadle. In Fig. 3, a rocking elbow-lever, K, is shown as operating the valve. The same result may be produced by a cord and lever, as shown in dotted lines in this figure, which also shows a sliding hand-lever, L, which is sometimes advantageous in working lathes. It is obvious that in some cases a weight might be substituted for the spring, to close the valve.

I claim as my invention—

1. The combination, substantially as described, of the throttle-valve and foot-lever, for the purpose set forth.

2. The combination, substantially as described, of the throttle-valve and knee-lever, for the purpose set forth.

3. The combination, substantially as set forth, of a throttle-valve, a foot-lever for opening said valve, and a spring, or its equivalent, for closing the valve.

4. The combination, substantially as described, of a throttle-valve, a foot-lever, and a hand-lever, for the purposes set forth.

EZRA NICHOLSON.

Witnesses:

ALFRED ELWELL,
A. D. NEWCOMB.